US008296558B1

(12) United States Patent
Chowdhury

(10) Patent No.: US 8,296,558 B1
(45) Date of Patent: Oct. 23, 2012

(54) METHOD AND APPARATUS FOR SECURING COMMUNICATION BETWEEN A MOBILE NODE AND A NETWORK

(75) Inventor: Kuntal Chowdhury, Plano, TX (US)

(73) Assignee: Apple Inc., Cupertino, CA (US)

( * ) Notice: Subject to any disclaimer, the term of this patent is extended or adjusted under 35 U.S.C. 154(b) by 1147 days.

(21) Appl. No.: 10/723,335

(22) Filed: Nov. 26, 2003

(51) Int. Cl.
*H04L 29/06* (2006.01)
(52) U.S. Cl. ........... 713/151; 380/277; 726/12; 713/153
(58) Field of Classification Search .................. 713/151, 713/153; 726/12; 380/277, 30
See application file for complete search history.

(56) References Cited

U.S. PATENT DOCUMENTS

| 6,874,084 B1* | 3/2005 | Dobner et al. | 713/156 |
|---|---|---|---|
| 7,127,613 B2* | 10/2006 | Pabla et al. | 380/277 |
| 7,254,712 B2* | 8/2007 | Godfrey et al. | 713/176 |
| 7,380,124 B1* | 5/2008 | Mizell et al. | 713/153 |
| 7,389,412 B2* | 6/2008 | Sharma et al. | 713/153 |
| 2002/0120844 A1* | 8/2002 | Faccin et al. | 713/168 |
| 2003/0092425 A1* | 5/2003 | Okazaki et al. | 455/411 |
| 2004/0228490 A1* | 11/2004 | Klemba et al. | 380/270 |
| 2005/0025091 A1* | 2/2005 | Patel et al. | 370/328 |

OTHER PUBLICATIONS

Dommety et al., "Mobile IP Vendor/Organization-Specific Extension", RFC 3115, Apr. 2001.*
"CDMA2000 Wireless IP Network Standard: Introduction", 3rd Generation Partnership Project 2 "3GPP2", Aug. 2003, 25 pages.
W. Simpson, "The Point-to-Point Protocol (PPP)", Jul. 1994, 48 pages.
W. Simpson, "PPP Authentication Protocols", Oct. 1992, 18 pages.
W. Simpson, "PPP Challenge Handshake Authentication Protocol (CHAP)", Aug. 1996, 15 pages.
C. Perkins, "IP Mobility Support for IPv4", Aug. 2002, 109 pages.
C. Perkins, et al., "Mobile IPv4 Challenge/Response Extensions", Nov. 2000, 19 pages.
G. Dommety, et al., "Mobile IP Vendor/Organization-Specific Extensions", Apr. 2001, 10 pages.
J. Reynolds, et al., "Assigned Numbers", Oct. 1994, 205 pages.
W. Simpson, "PPP Vendor Extensions", May 1997, 9 pages.
J. Postel, "Internet Control Message Protocol", Sep. 1981, 24 pages.

* cited by examiner

*Primary Examiner* — Hadi Armouche
(74) *Attorney, Agent, or Firm* — Meyertons, Hood, Kivlin, Kowert & Goetzel, P.C.

(57) ABSTRACT

In accordance with the teachings of the present invention, a method and apparatus is presented for securely negotiating a session key between a mobile node and a network node, such as a first hop IP router. A session key is encoded using asymmetric encryption. The encrypted session key is then communicated to the first hop IP router for later use. In accordance with another teaching of the present invention, the session key is then used by the mobile node and a first hop IP router to authenticate a message. Lastly, in accordance with the third teaching of the present invention, a standardized protocol is used to securely negotiate the session key between the mobile node and the first hop IP router.

17 Claims, 13 Drawing Sheets

METHOD AND APPARATUS FOR SECURING COMMUNICATION BETWEEN A MOBILE NODE AND A NETWORK

BACKGROUND OF THE INVENTION

1. Field of the Invention

This invention relates to communication networks.

2. Description of the Prior Art

Wireless technology has grown substantially. A conventional wireless communication system may include a mobile node, a base station, a first hop Internet Protocol (IP) router and an Internet Protocol network. The mobile node communicates with the base station, the base station is in communication with the first hop IP router, and the first hop IP router is in communication with a back haul network, such as an IP network.

During operation, the mobile node sends communication to the first hop IP router through the base station. The first hop IP router responds to the communication from the mobile node and allocates resources to provide a quality of service (QoS) and to initiate services at the level of the QoS. Using current standards and conventional techniques there is no mechanism to authenticate the mobile node before allocating resources and initiating services at the level of the QoS. Therefore, a hacker or unauthorized user may gain access to the network and utilize services.

Thus, there is a need for a method and apparatus for authenticating a mobile node. There is a need for a method and apparatus for safeguarding a wireless network against hackers and unauthorized users. There is a need for a method and apparatus for providing network security between a mobile node and first hop IP router.

SUMMARY OF THE INVENTION

The present invention is directed to a method and apparatus for securely negotiating a session key between a mobile node and a first hop IP router. In one embodiment, standardized protocols are used to implement the negotiation. In another embodiment, once the session key has been securely negotiated, the session key is used to authenticate messages from the mobile node at the first hop IP router.

In one embodiment, a session key is encrypted using asymmetric encryption. A public key is communicated from a first hop IP router to a mobile node. The mobile node uses the public key to encrypt a session key generated by the mobile node. The mobile node then communicates the encrypted session key to the first hop IP router. The first hop IP router decrypts the session key and uses the session key for subsequent communications with the mobile node.

In one embodiment, the public key is communicated from the first hop IP router to the mobile node using existing protocols. In addition, the encrypted session key is communicated from the mobile node to the first hop IP router using existing protocols. In one embodiment, link level protocols and/or network level protocols as defined by the International Organization for Standardization (ISO), Open System Interconnection (OSI) model are used to communicate the public key and the encrypted session key. For example, (a) the public key and encrypted session key may be communicated using predefined messaging associated with a protocol; (b) the public key and the private key may be implemented in a predefined packet field associated with a protocol; and/or (c) the public key and the private key may be transported in extensions made to the messaging or packet formats associated with a protocol.

The session key is combined with an original message and communicated by the mobile node. In one embodiment, a checksum is made of the message. A function is performed using the checksum and the session key as inputs. The output of the function is an authentication code. The authentication code is appended to the original message or encoded with the original message and communicated to the first hop IP router. The session key is used to authenticate the messages in a first hop IP router. In one embodiment, the first hop IP router receives the message with the appended or encoded authentication code. The message is separated from the authentication code. A checksum is performed on the message. Decryption is performed using the authentication code and a session key stored by the first hop IP router. The output of the checksum performed on the message and the output of the symmetric decryption are compared. If the output is the same as the message checksum (i.e., comparison matches), the message has been authenticated. If the output is different than the message checksum, the message is not authenticated.

A method of operating comprises the steps of operating protocol; receiving a public key in response to operating the protocol; generating an encrypted session key in response to receiving the public key; and communicating the encrypted session key in response to operating under the protocol.

A method of operating comprises the steps of operating a protocol; communicating a public key in response to operating the protocol; receiving an encrypted session key in response to communicating the public key and in response to operating the protocol; and decrypting the encrypted session key with a private key.

A method of generating a message comprising the steps of accessing a message; generating a checksum of the message; accessing a session key; generating an authentication code in response to generating the checksum of the message and in response to accessing the session key; and generating an output message in response to the message and in response to the authentication code.

A method of authenticating a message comprising the steps of receiving message; receiving an authentication code; generating a first checksum of the message; accessing a session key; generating a second checksum of the message in response to the authentication code and in response to accessing the session key; and
comparing the first checksum of the message with the second checksum of the message.

A mobile node comprises means for operating protocol; means for receiving a public key in response to operating the protocol; means for generating an encrypted session key in response to receiving the public key; and means for communicating the encrypted session key in response to operating under the protocol.

A network device comprises means for receiving message; means for receiving an authentication code; means for generating a first checksum of the message; means for accessing a session key; means for generating a second checksum of the message in response to the authentication code and in response to accessing the session key; and means for comparing the first checksum of the message with the second checksum of the message.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
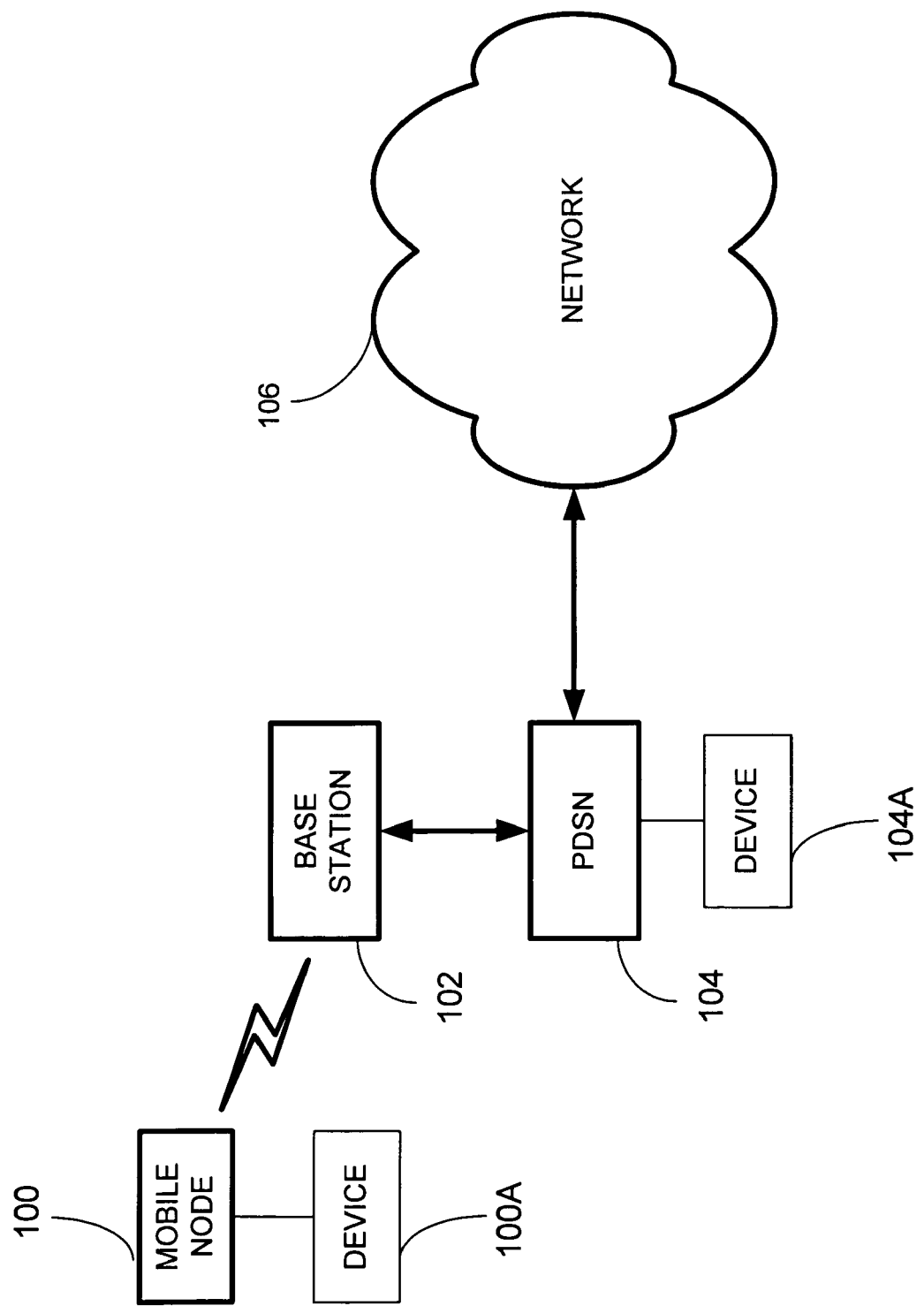
FIG. 1 displays a network implementing the teachings of the present invention.

FIG. 1 displays a network implemented in accordance with the teachings of the present invention. A mobile node 100 is in communication with a base station 102. The mobile node 100 may be implemented with a wireless protocol, such as CDMA2000, or any of the family of protocols promulgated by the Third Generation Partnership Project 2 (3GPP2) or another wireless standards making body (e.g., 3GPP, IEEE etc.). The mobile node 100 may represent a telephone, a Personal Data Assistant (PDA), a computer laptop with a wireless interface, etc.

The base station 102 is in communication with a PDSN 104. The PDSN 104 is often considered the "first hop Internet Protocol (IP) router." In an alternate embodiment, the mobile node 100 may communicate with a router or node other than the first hop IP router. It should be appreciated that the methodology and teachings of the present invention extend to this scenario as well. The PDSN 104 then communicates with a backhaul network 106. Network 106 may represent any communication network, such as a circuit-switched network, a packet-switched network, an integrated network, etc. Further, network 106 may operate based on a variety of protocols, such as the Internet Protocol (IP).

In one embodiment of the present invention, a device 100A is communication with the mobile node 100. The device 100A may represent an apparatus, which connects directly to the mobile node 100, such as a cradle for a cellular telephone, a docking station for a PDA, a docking station for a laptop, etc. In an alternate embodiment, the device 100A may represent an apparatus, which communicates with the mobile node 100, such as another wireless device or a device which communicates across a network. Lastly, in another configuration, the device 100A may include a device, which is directly connected to the mobile node 100 and a device, which is in communication with the mobile node 100, such as a computer, which communicates over an Ethernet connection to a docking station directly connected to the mobile node 100.

In one embodiment of the present invention, a device 104A is in communication with the PDSN 104. The device 104A may represent an apparatus, which connects directly to the PDSN 104, such as a computing device. In an alternate embodiment, the device 104A may represent an apparatus that communicates with the PDSN 104, such as a wireless device or a device that communicates across a network. Lastly, in another configuration, the device 104A may include a device that is directly connected to the PDSN 104 in combination with a device that is in communication with the PDSN 104, such as a computer that communicates over an Ethernet connection to a computer directly connected to PDSN 104.

Figure 2:
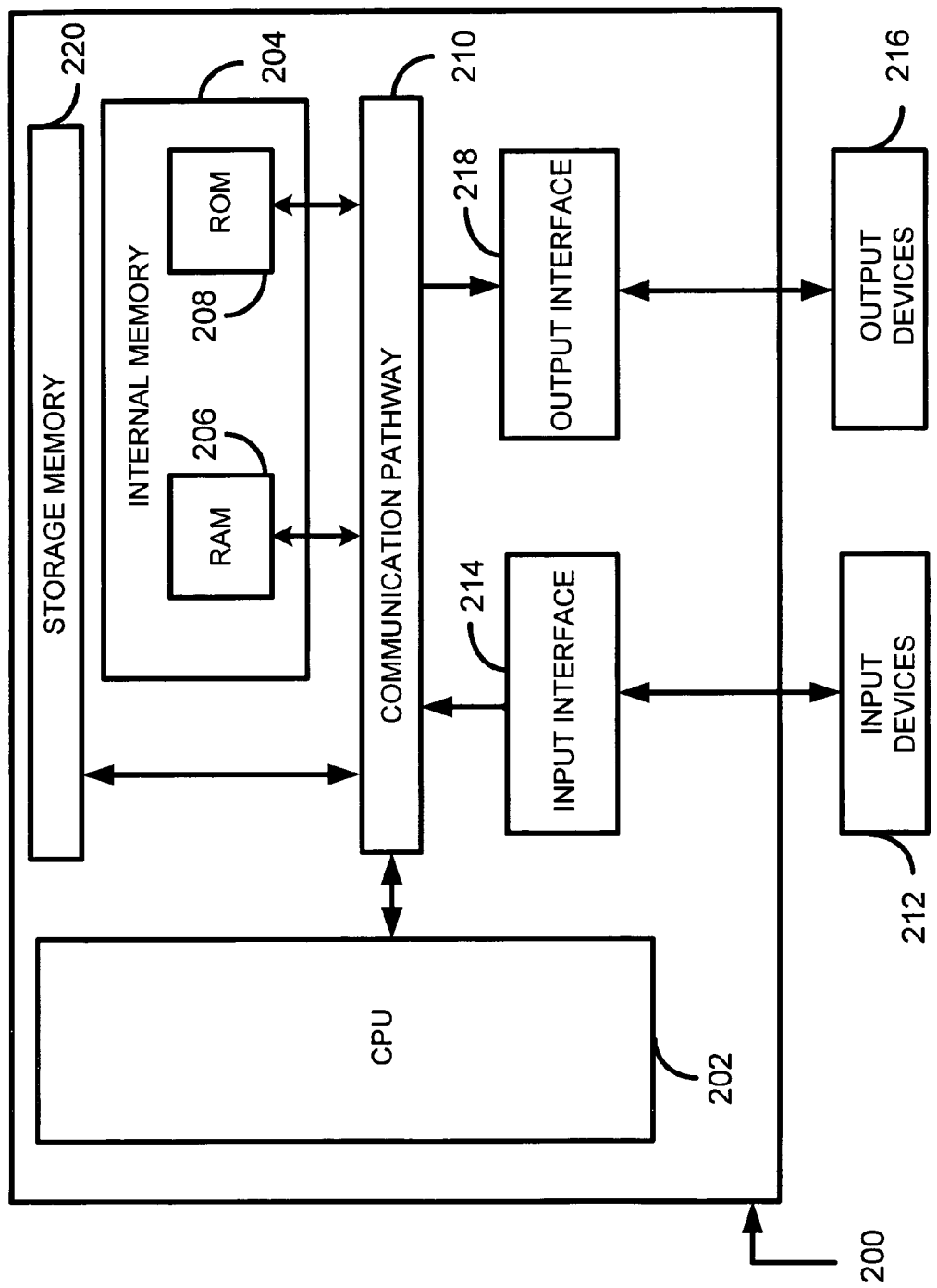
FIG. 2 displays a block diagram of a computer implemented in accordance with the teachings of the present invention.

FIG. 2 displays a computer architecture implemented in accordance with the teachings of the present invention. The computer 200 of FIG. 2 may implement the mobile node 100, the device 100A, the base station 102, the PDSN 104, the device 104A, and components of the network 106 of FIG. 1. A central processing unit (CPU) 202 functions as the brain of the computer 200. Internal memory 204 is shown. The internal memory 204 includes short-term memory 206 and long-term memory 208. The short-term memory 206 may be a Random Access Memory (RAM) or a memory cache used for staging information. The long-term memory 208 may be a Read Only Memory (ROM) or an alternative form of memory used for storing information. Storage memory 220 may be any memory residing within the computer 200 other than internal memory 204. In one embodiment of the present invention, storage memory 220 is implemented with a hard drive. A communication pathway 210 is used to communicate information within computer architecture 200. In addition, the communication pathway 210 may be connected to interfaces, which communicate information out of the computer 200 or receive information into the computer 200.

Input devices, such as tactile input device, joystick, keyboards, microphone, communications connections, or a mouse, are shown as 212. The input devices 212 interface with the system through an input interface 214. Output devices, such as a monitor, speakers, communications connections, etc., are shown as 216. The output devices 216 communicate with computer 200 through an output interface 218.

Figure 3:
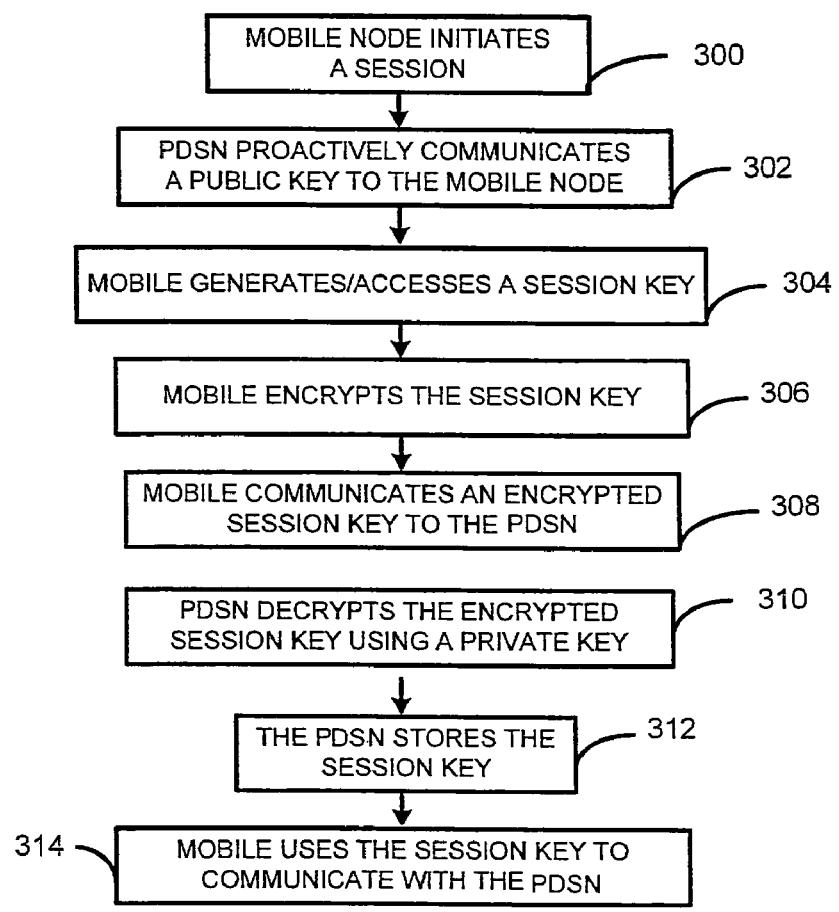
FIG. 3 displays a flow diagram depicting a method of securely negotiating a session key.

FIG. 3 displays a flow diagram depicting a method of securely negotiating a session key. FIG. 1 will be discussed in conjunction with FIG. 3. In one embodiment of the present invention, an asymmetric encryption implementation (i.e., technique) is used to negotiate a session key between a mobile node and a first hop IP router, such as a PDSN. In asymmetric encryption, a pair of keys are used, a public key and a private key. As their names suggest, the private key is kept private, while the public key is distributed. For example, in one embodiment of the present invention, the private key is stored in the first hop IP router while the public key is distributed to mobile nodes that communicate with the first hop IP router. In another embodiment, the public and private keys are related through a mathematical relationship that links one key to the other. As a result, once the public key is used to encrypt a message, the private key is required to decrypt the message. For example, in one embodiment, the mobile node uses the public key to encrypt a message and the first hop IP router uses the private key to decrypt the message.

At step 300 of FIG. 3, a mobile node initiates a session. For example, mobile node 100 communicates through the base station 102 with the PDSN 104 to initiate a session. Once a first hop IP router, such as the PDSN 104, becomes aware of the mobile node 100, the PDSN 104 communicates a public key to the mobile node 100 as stated at 302. For example, in one embodiment, the PDSN 104 includes both a public key and a private key. The PDSN 104 communicates the public key through the base station 102 to the mobile node 100. At 304, the mobile node 100 generates and/or accesses a session key. The mobile node 100 uses a variety of method to generate a session key. For example, a random number generator may be implemented to generate a session key. However, it should be appreciated that any method used to generate a session key is within the scope of the present invention. In an alternate embodiment, the mobile node 100 accesses a session key from a storage media deployed in the mobile node 100 or from a storage media, such as a device 100A directly connected to the mobile node 100. Lastly, in another embodiment, the session key may be generated by another device 100A in communication with the mobile node 100 and the mobile node 100 may access the session key from the device 100A.

At 306, the mobile node encrypts the session key. In one embodiment, encrypting the session key produces an encrypted session key. At 308, the mobile node 100 communicates the encrypted session key to the PDSN 104. At 310, the first hop IP router, such as PDSN 104, receives and decrypts the session key using a private key. At 312, the PDSN stores the session key for further communications. For example, a number of mobile nodes 100 may communicate with the PDSN 104 and the PDSN 104 may store a number of session keys. In one embodiment, when the PDSN 104 is implemented with the computer architecture shown in FIG. 2, the PDSN 104 may store a session key in a hard drive, random access memory, etc. Lastly, at 314, the mobile node 100 uses the session key to communicate with the PDSN 104.

Figure 4:
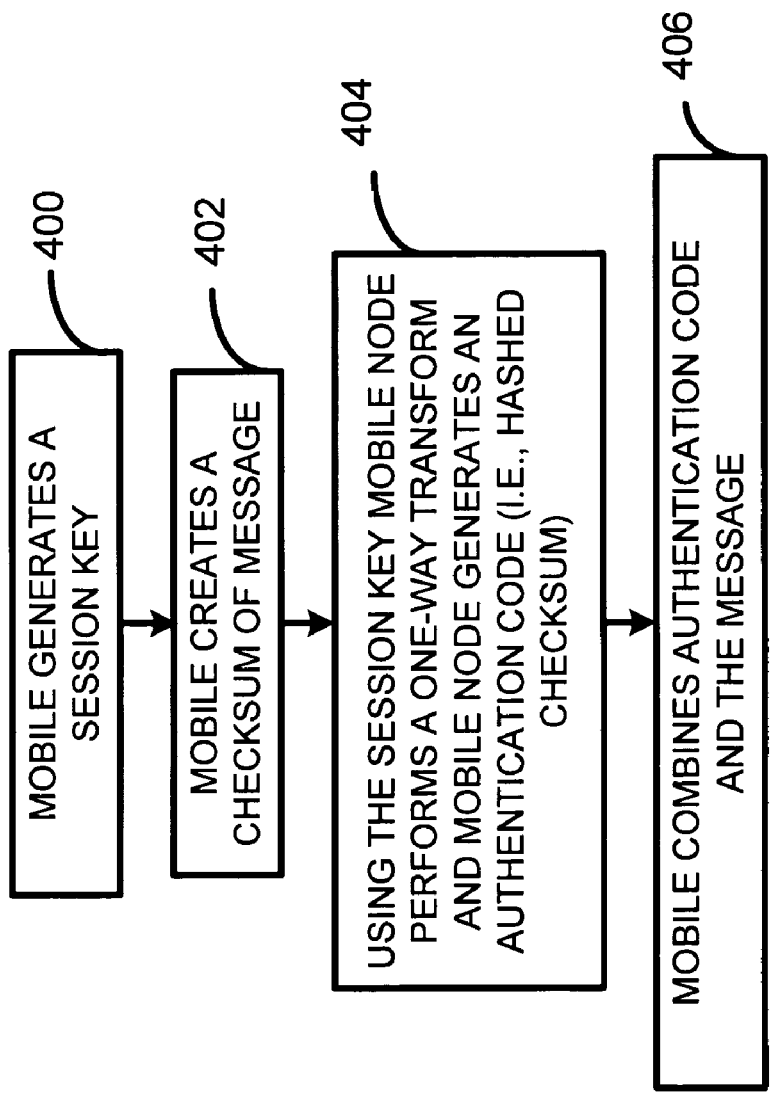
FIG. 4 displays a flow diagram depicting a method of encrypting a session key.

FIG. 4 displays a flow diagram depicting a method of generating an encrypted message in accordance with the teachings of the present invention. FIG. 1 will be discussed in conjunction with FIG. 4. In one embodiment of the present invention, the method associated with FIG. 4 performs a symmetric implementation (i.e., technique) A mobile node, such as mobile node 100, requests service. In one embodiment, after the mobile node 100 requests service, the mobile node 100 receives a public key. For example, the mobile node 100 may receive a public key from the PDSN 104. The mobile node 100 generates a session key as stated at 400 or in the alternative, if a session key has already been generated for the current session, the mobile node 100 accesses and uses the previously generated session key. The mobile node 100 then performs a checksum on a message that the mobile node 100 intends to transmit as stated at step 402. A variety of techniques may be used to implement a checksum and are within the scope of the present invention. The mobile node 100 uses the session key to perform a one-way transform. The result of the one-way transform is an authentication code as stated at 404. In one embodiment, the authentication code is a hashed checksum.

In one embodiment of the present invention, the hashed checksum is performed using a hashing function. A hashing function H is a transform that takes input(s) m and n and returns a fixed-size string, which is called the hash value h where, $h=H(m,n)$. For example, in one embodiment, the checksum of the message may represent m and the session key may represent n. A hash transform H is a one-way transform when for a given hash value h, it is computationally infeasible to find an input x, such that $H(x)=h$.

After generating the hash (i.e., authentication code), the mobile node 100 then combines the authentication code with the message as stated at 406. In one embodiment, the authentication code is appended to the message. In another embodiment, the authentication code is encoded with the message to create an encoded bitstream. The message, authentication code, combination or the encoded bitstream is then communicated to the first hop IP router (i.e., PDSN 104).

Figure 5:
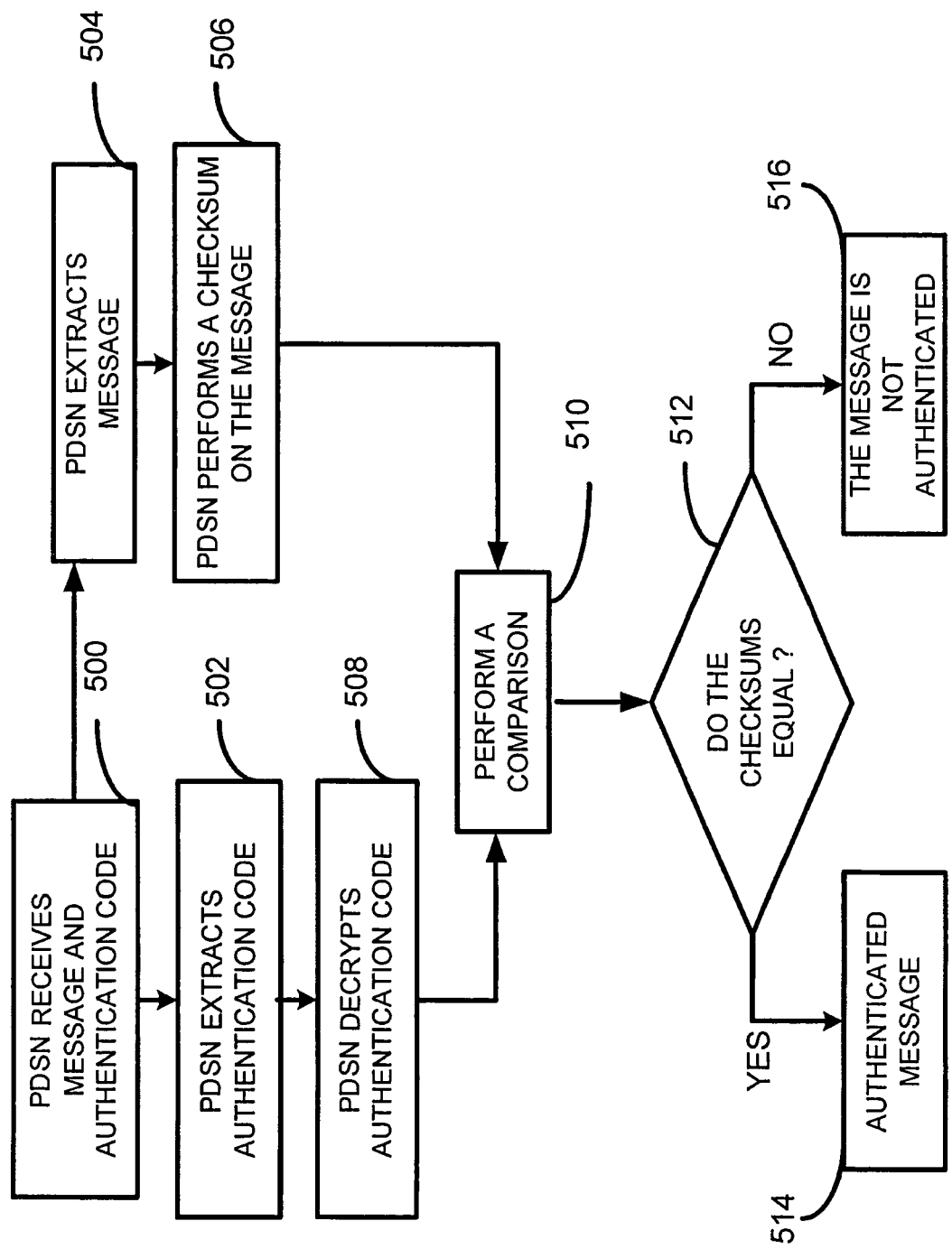
FIG. 5 displays a flow chart depicting a method of encrypting and authenticating a message.

FIG. 5 displays a flow chart depicting a method of encrypting and authenticating an encrypted message in accordance with the teachings of the present invention. FIG. 1 will be discussed in conjunction with FIG. 5. At step 500, a first hop router, such as PDSN 104, receives a message with an appended authorization code or an encoded bitstream communicated by a mobile node 100. The PDSN 104 extracts the authentication code from the message with the appended authorization code or from the encoded bitstream as stated at 502. The PDSN 104 decrypts the authentication code as stated at 508. The PDSN 104 extracts the message as stated at 504. The PDSN 104 performs a checksum on the message as stated at 506. In one embodiment, the technique for performing the checksum in the PDSN 104 is the same as the technique used to perform the decrypted authentication code generated at step 508 with the checksum performed on the message at step 506. At step 510, the test is made to determine if the checksums (i.e., decrypted authentication code extracted at step 508 and checksum generated at step 506) are equal. At step 512, if the checksums do equal, the message is authenticated as stated at step 514. At step 512, if the checksums do not equal, the message is not authenticated as stated at step 516.

Figure 6A:
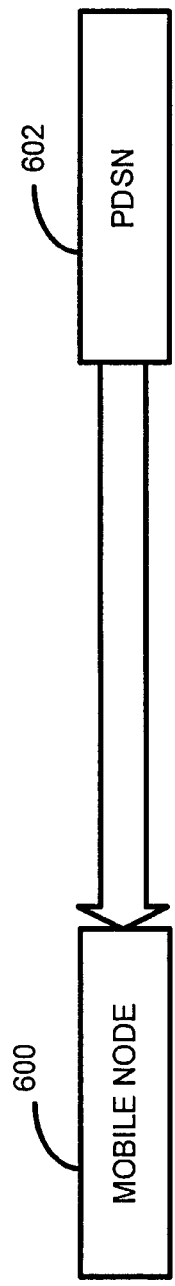
FIG. 6A displays a block flow diagram depicting a method of communicating a public key in accordance with the teachings of the present invention.
Figure 6B:
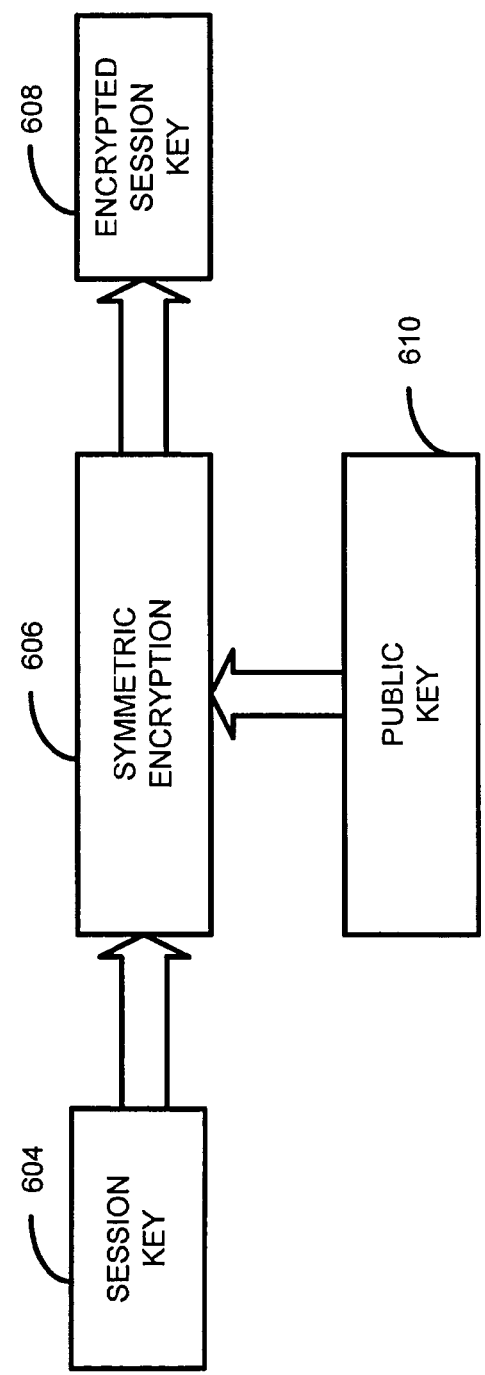
FIG. 6B displays a block flow diagram depicting a method of encrypting a session key in accordance with the teachings of the present invention.
Figure 6C:
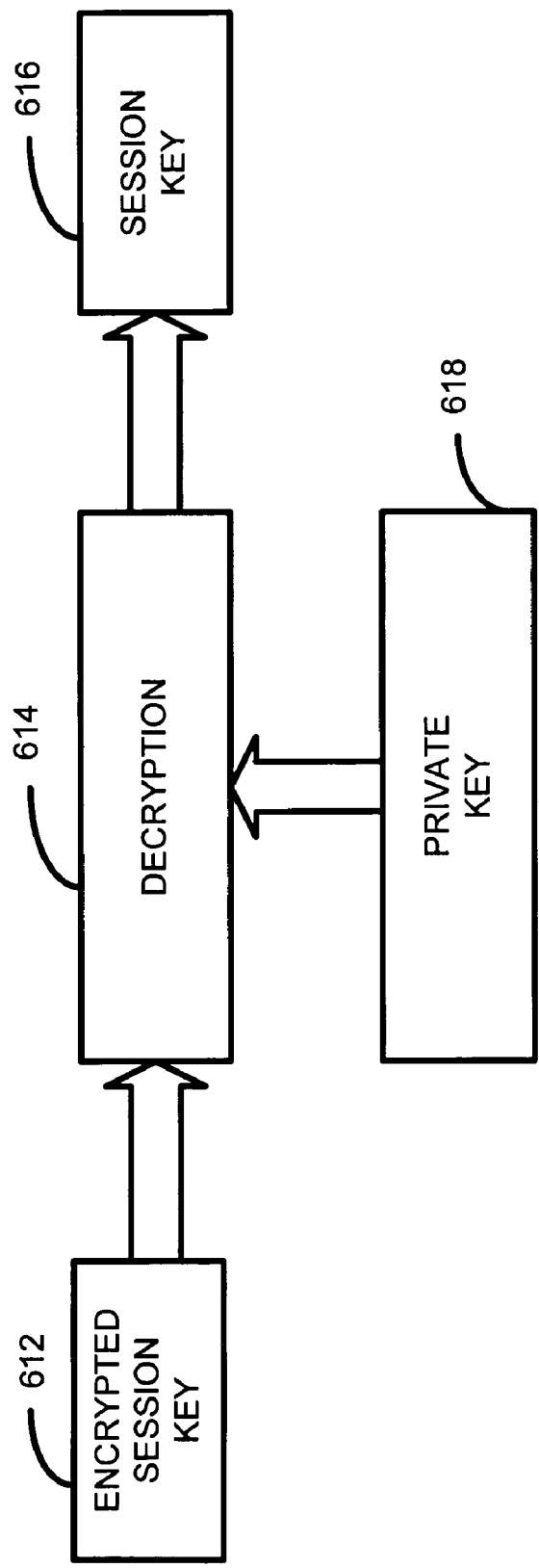
FIG. 6C displays a block flow diagram depicting a method of decrypting a session key in accordance with the teachings of the present invention.

The combination of FIGS. 6A, 6B, and 6C display a block flow diagram depicting a method of securely negotiating a session key in accordance with the teachings of the present invention. FIG. 6A displays a block flow diagram depicting a method of communicating a public key in accordance with the teachings of the present invention. FIG. 6B displays a block flow diagram depicting a method of encrypting a session key in accordance with the teachings of the present invention. FIG. 6C displays a block flow diagram depicting a method of decrypting a session key in accordance with the teachings of the present invention.

The combination of methods depicted by block flow diagrams FIGS. 6A, 6B, and 6C depict a method of securely negotiating a session key. For example, a public key is communicated to the mobile node as shown by FIG. 6A; a session key is generated and encrypted using the public key as shown by FIG. 6B; and the session key is decrypted using a private key as depicted by FIG. 6C. As such, a session key is securely communicated between the mobile node and the first hop IP router.

In FIG. 6A a first hop IP router, such as the PDSN 602 communicates a public key to a mobile node 600. In one embodiment, the mobile node 600 initiates a session with the PDSN 602 and then the PDSN 602 communicates the public key to the mobile node 600. In another embodiment, the PDSN 602 unilaterally communicates the public key to the mobile node 600.

In one embodiment of the present invention, the method depicted by the block flow diagram displayed in FIG. 6B occurs within a mobile node, such as mobile node 100 of FIG.

1. However, it should be appreciated that the method depicted by the block flow diagram displayed in FIG. 6B may be performed in a base unit used to house the mobile node, such as a cradle, in a computing device in communication with the mobile node, such as a computer, etc.

In one embodiment, the mobile node generates a session key 604. For example, the mobile node may access a previously generated session key from a memory. In another embodiment, the mobile node generates a session key 604. In one embodiment, the session key 604 may be implemented as a unique key that identifies a specific session for a specific mobile node, a group of sessions for a specific mobile node, a specific session for a group of mobile nodes, a group of sessions for a group of mobile nodes, etc.

The mobile node then receives or accesses a public key 610. For example, a public key 610 may be communicated by a first hop IP router and used in real time. In the alternative, a public key 610 may be stored and/or buffered by the mobile node and used when required. Symmetric encryption 606 is performed using the session key 604 and the public key 610. The result of the symmetric encryption 606 is an encrypted session key 608. The encrypted session key 608 is communicated to the first hop IP router.

In one embodiment of the present invention, the method depicted by the block flow diagram displayed in FIG. 6C may occur within a first hop IP router, such as the PDSN 104 of FIG. 1. However, it should be appreciated that the method depicted by the block flow diagram displayed in FIG. 6C may be performed in a variety of devices in communication with the first hop IP router.

In one embodiment, an encrypted session key 612 that was generated by the mobile node is received in a first hop IP router. A private key 618 is accessed or received by the first hop IP router. Symmetric decryption 614 is performed using the encrypted session key 612 and the private key 618. The result of the decryption 614 is the session key 616. The session key 616 may then be used for further communications between a PDSN and a mobile node, such as PDSN 104 and mobile node 100 of FIG. 1.

Figure 7:
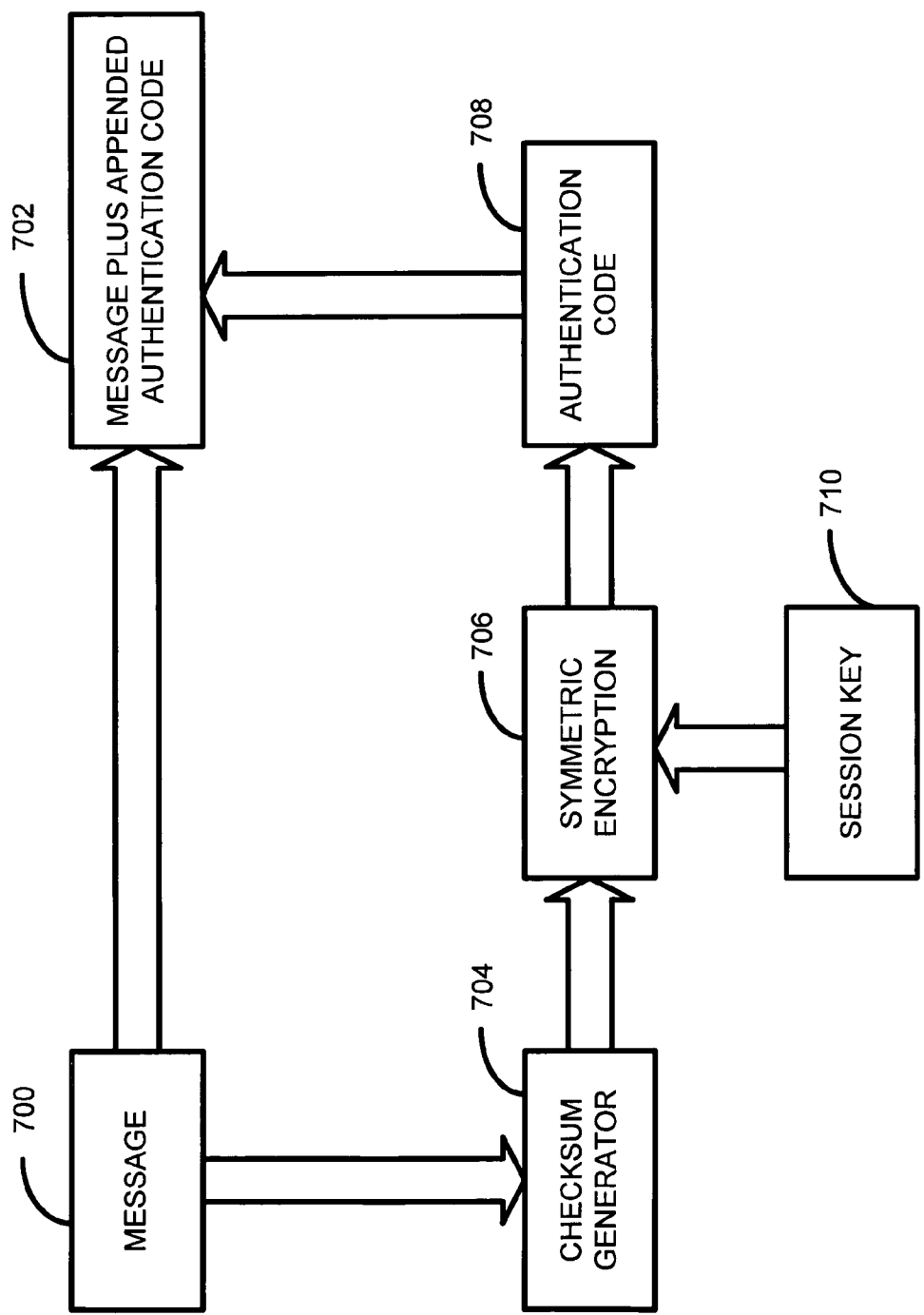
FIG. 7 displays a block flow diagram depicting a method of generating and encrypting a message in accordance with the teachings of the present invention.

FIG. 7 displays a block flow diagram depicting a method of generating and encrypting a message in accordance with the teachings of the present invention. FIG. 1 will be discussed in conjunction with FIG. 7. In one embodiment of the present invention, the method depicted in FIG. 7 may be performed in a mobile node 100. In another embodiment of the present invention, the method depicted in FIG. 7 may be performed in a computing device in communication with the mobile node 100. A message 700 is generated. A checksum 704 is performed on the message 700. The checksum (i.e., checksum value) 704 and the session key 710 are used to perform encryption 706. In one embodiment, a symmetric encryption is performed; however, other encryption techniques may be performed and still remain within the scope of the present invention. The result of the encryption 706 is an authentication code 708. The message 700 is then appended to the authentication code 708. However, it should be appreciated that in another embodiment of the present invention, the message 700 may be combined with the authentication code 708 using a variety of methods, such as further encoding, etc. prior to communicating the message 700 plus the authentication code 708. The message plus authentication code 702 is then communicated.

Figure 8:
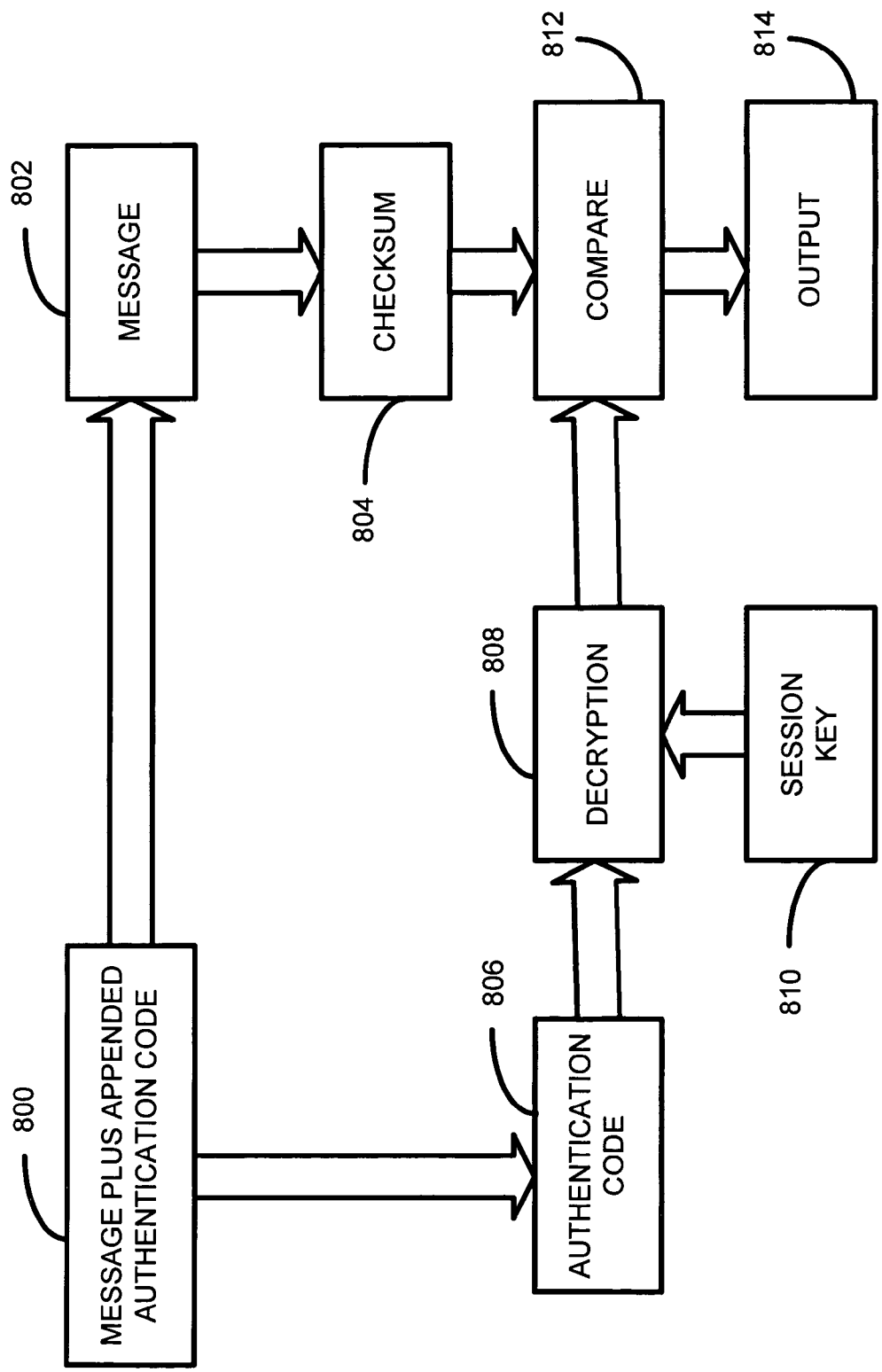
FIG. 8 displays a block flow diagram depicting a method of decrypting and authenticating a message in accordance with the teachings of the present invention.

FIG. 8 displays a block flow diagram depicting a method of decrypting and authenticating a message in accordance with the teachings of the present invention. FIG. 1 will be discussed in conjunction with FIG. 8. In one embodiment of the present invention, the method depicted in FIG. 8 may be performed in a first hop IP router. In another embodiment of the present invention, the method depicted in FIG. 8 may be performed in a computing device in communication with a first hop IP router.

A message plus an appended authentication code 800 is received. For example, the message plus appended authentication code 800 may be received in a first hop IP router, such as the PDSN shown in FIG. 1. The message plus an appended authentication code 800 is separated from the authentication code 806. In the case where the message plus an appended authentication code 800 was encoded with the authentication code 806, a decoding step may be performed. A checksum 804 is performed on the message 802. Symmetric decryption 808 is performed on the authentication code 806 using the session key 810. The output of the checksum 804 and the output of the decryption 808 are compared 812. The comparison 812 produces an output 814. In one embodiment, if the output of the checksum 804 is equivalent to the output of the decryption 808, the output is positive and the message is authenticated. If the output of the checksum 804 is not equivalent to the output of the decryption 808, the output is negative and the message is not authenticated.

Figure 9:
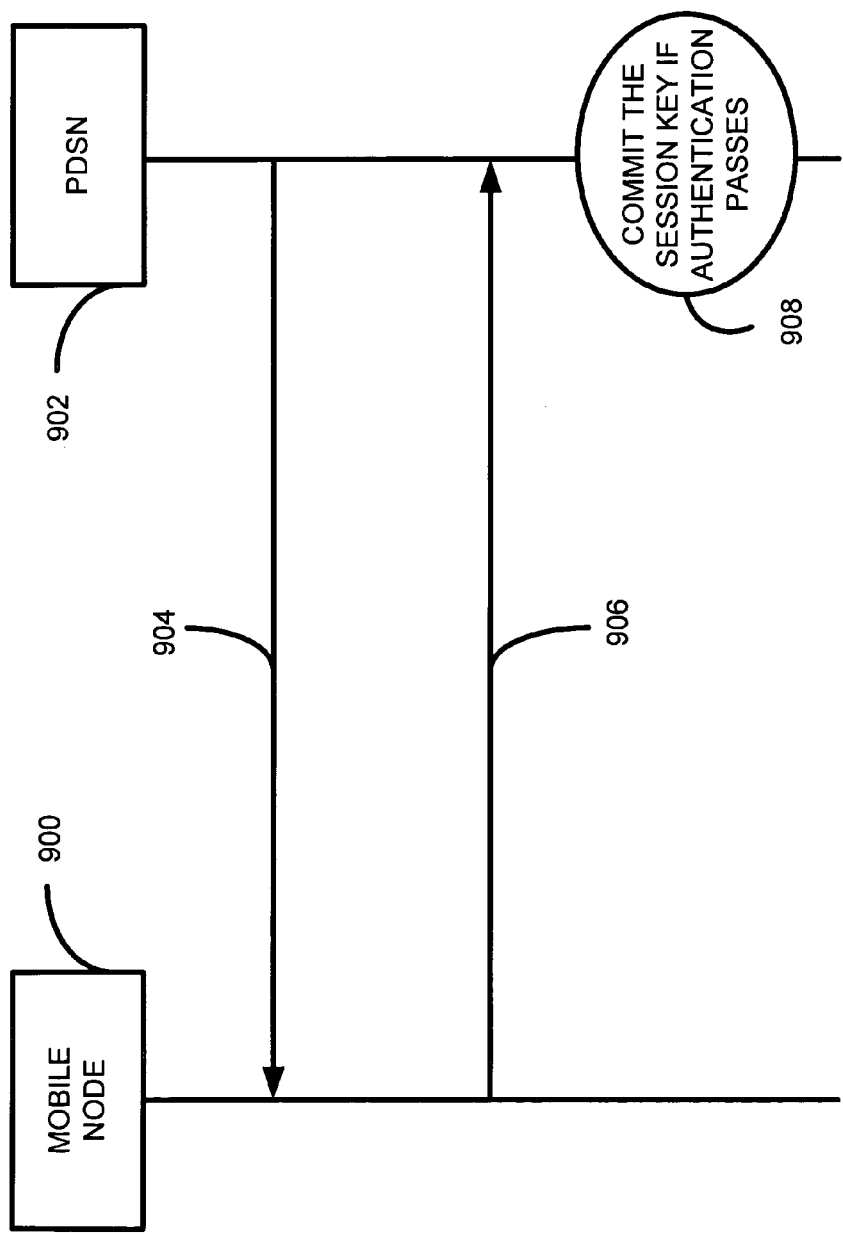
FIG. 9 displays a message flow diagram depicting a method of negotiating a session key in accordance with the teachings of the present invention.

FIG. 9 displays a message flow diagram depicting a method of negotiating a session key in accordance with the teachings of the present invention. A mobile node 900 is in communication with a first hop IP router, such as a PDSN 902. The PDSN 902 communicates a public key as shown by 904 and the mobile node 900 responds with an encrypted session key as shown by 906. In one embodiment, the communication from the PDSN 902 to the mobile node 900 may be considered a forward communication and the communication from the mobile node 900 to the PDSN 902 may be considered a reverse communication. As mentioned previously, the mobile node 900 receives the public key 904 and uses the public key 904 to encrypt a session key generated and/or accessed by the mobile node 900. The mobile node 900 then communicates the encrypted session key 906 back to the PDSN 902 as shown by 906 where the PDSN 902 decrypts the session key and uses the session key for message authentication. In one embodiment of the present invention, once a message is authenticated, the session key is committed and is used as the working session key as stated at 908.

In one embodiment, a variety of protocols are used to communicate information between the mobile node 900 and the PDSN 902. A protocol may include any protocol associated with a standards making body, such as the 3GPP2, IETF, 3GPP, IEEE etc. In such a scenario, the protocol may be referred to as a standards protocol. In the alternative, a protocol may represent any protocol, which is in use among a group of users.

In one embodiment of the present invention, the protocol is used to communicate the public key as shown by 904 and return the encrypted session key as shown by 906. For example, a protocol is typically implemented with packets. Each protocol has a defined packet format. In one embodiment of the present invention, the public key 904 and the encrypted session key 906 are each placed in fields within a defined packet. Further, protocols communicate using various predefined messages and message sequences. In another embodiment of the present invention, the predefined messages and message sequences are used to communicate the public key 904 and the encrypted session key 906. Lastly, in another embodiment of the present invention, extensions are made to a protocol to implement the present invention. For example, extensions are made to the packet format or new messages are added to implement the present invention. Therefore, in accordance with the teachings of the present invention, predefined messages, message sequences of messages, predefined packet formats, extensions to the predefined messages, and extensions to the predefined packet formats are used to securely negotiate a session key between a mobile node 900 and a first hop IP router, such as a PDSN 902.

The secure negotiation of a session key using a variety of protocols is presented in the instant application. For example, the secure negotiation of a session key using the mobile IPv4, simple IPv4, simple IPv6, and mobile IPv6 are presented. Each method of securely negotiating a session key takes advantage of preexisting messaging and packet formats defined in mobile IPv4, simple IPv4, simple IPv6, and mobile IPv6.

For simple Ipv4, simple Ipv6, and mobile Ipv6, a built in Point-to-Point (PPP) protocol authentication mechanism as defined by RFC 1661 may be used. PPP defines a standard encapsulation protocol for the transport of different network layer protocols (including, but not limited to, IP) across serial, point-to-point links, etc. PPP also describes mechanisms for network-protocol multiplexing, link configuration, link quality testing, authentication, header compression, error detection, and link-option negotiation. PPP has three main functional components: (a) a method for encapsulating datagrams over serial links, based on the ISO High-Level Data Link Control (HDLC) protocol; (b) a Link Control Protocol (LCP) for establishing, configuring, authenticating, and testing the data-link connection; and (c) a family of Network Control Protocols (NCPs) for establishing and configuring different network layer protocols. However, it should be appreciated that the PPP standard will evolve and the messaging and packet format may also evolve. Therefore, an evolving PPP standard is contemplated and within the scope of the present invention.

LCP and/or NCP are implemented to establish a connection using PPP. To establish a connection over a point-to-point link, connections are established one layer at a time. First, the physical layer and HDLC data link layer must be operational. Next, LCP packets are exchanged to configure and authenticate the link. NCP procedures are then used to establish network layer connections for one or more network layer protocols. The link will remain operational until LCP or NCP procedures are used to terminate the PPP link, or the link fails.

PPP currently defines two authentication mechanisms, the Password Authentication Protocol (PAP) defined in RFC 1334 and the Challenge Handshake Authentication protocol (CHAP) both defined in RFC 1994. In one embodiment, the PAP provides a simple method for a peer to establish its identity using a two-way handshake. In one embodiment, the CHAP is used to periodically verify the identity of a peer using a three-way handshake. However, additional authentication mechanisms may be implemented and are within the scope of the present invention.

A discussion of a method of securely negotiating a session key using mobile Ipv4 as the implementation mechanism is presented using FIG. 9. The method makes use of built in authentication for mobile Ipv4 messages as defined in protocol standards 3GPP2-X.S0011-C, RFC 3344, RFC 3012, and RFC 3115. In mobile Ipv4, the foregoing protocol standards define a method of registering a mobile node with a network. In addition, the foregoing standards define a packet format used when registering the mobile node with the network. The method of registering the mobile node is detailed in RFC 3344, which defines an initial request message (RRQ) and response as part of the registration process. In one embodiment of the present invention, the registration process including the RRQ message is used to implement the method of securely negotiating a session key.

RFC 3115 defines two Vendor/Organization Specific Extensions, Critical Vendor/Organization Specific Extensions (CVSE) and Normal Vendor/Organization Specific Extensions (NVSE). As defined by RFC 3115, when the CVSE is encountered but not recognized, the message containing the extension must be silently discarded, whereas when an NVSE is encountered but not recognized, the extension should be ignored, but the rest of the extensions and message data must still be processed. In one embodiment, the session key and the encrypted session key are placed in a Vendor-NVSE-Value field in an NVSE packet format (i.e., RFC 3115).

In one embodiment, the secure exchange of a session key can be enhanced if the PDSN uses the session key that the mobile node sent in an NVSE packet with and initial RRQ message when the RRQ is authenticated with a mobile node foreign agent or with a mobile node authentication, authorization, and accounting procedure.

In one embodiment, the mobile node foreign agent is defined in RFC 3344 as a router on a mobile node's visited network, which provides routing services to the mobile node while registered. The foreign agent detunnels and delivers datagrams to the mobile node that were tunneled by the mobile node's home agent. For datagrams sent by a mobile node, the foreign agent may serve as a default router for registered mobile nodes.

Mobile node authentication, authorization, and accounting (AAA) is a procedure in IP-based networking to control the computer resources that users have access to and to keep track of the activity of the users on the network for accounting purposes. Authentication is the process of identifying an individual and is typically based on username and password. However, other authentication schemes may be implemented. Authorization is the process of granting or denying a user access to network resources once the user has been authenticated. Accounting is the process of keeping track of a user's activity while the user is accessing the network resources.

Referring to FIG. 9, the PDSN 902 sends a public key that the mobile node 900 should use to encrypt the session key as shown by 904. In one embodiment, the PDSN 902 sends the public key in a Point-to-Point protocol vendor specific packet during PPP setup (i.e., NCP or LCP). The mobile node 900 then sends an RRQ for mobile Ipv4 registration to the PDSN 902 as depicted by 906. The RRQ includes mobile node 900 to foreign agent authentication extension and/or mobile node 900 to authentication, authorization, and accounting server authentication extension, mobile node 900 to foreign agent challenge extension, etc. (i.e., RFC 3012), an NVSE field containing a session key encrypted with the PDSNs public key. The PDSN 902 decrypts the session key and commits the session key after authentication as shown by 908. The PDSN 902 decrypts the session key and commits it to the mobile node 900 data session after the RRQ is successfully authenticated, authorized by the authentication, authorization and accounting server or the mobile node foreign agent related authentication passes.

Figure 10:
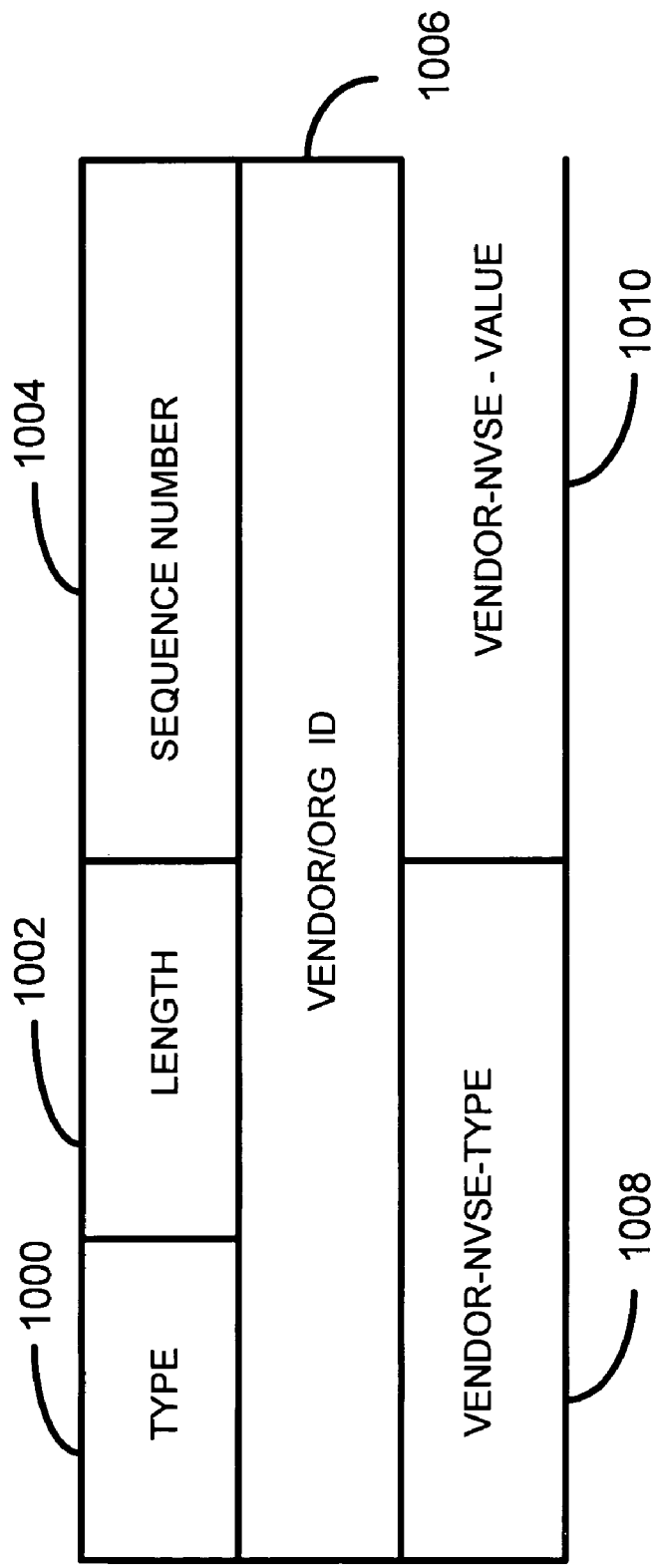
FIG. 10 displays an NVSE packet format, as defined by RFC 3115.

FIG. 10 displays an NVSE packet format as defined by RFC 3115. RFC 3115 enables organizations and vendors to include organization/vendor-specific information in the Mobile IP messages. With the imminent wide scale deployment of Mobile IP it is useful to have vendor or organization-specific extensions to support this capability. As discussed in the foregoing, the RFC 3115 defines two extensions that can be used for making organization specific extensions by vendors/organizations for their own specific purposes.

In one embodiment of the present invention, the method of securely negotiating a session key is implemented using the Normal Vendor/Organization Specific Extensions (NVSE) defined in RFC 3115. The NVSE defines a type field 1000, a length field 1002, a sequence number field 1004, a vendor/org-ID field 1006, a vendor-NVSE-type field 1008, and a vendor-NVSE-value field 1010. The type field 1000 is assigned NVSE-TYPE-NUMBER 134. The length field is defined as the length in bytes of this extension, not including the type and length bytes. The sequence number field 1004 is reserved for future use; however, until it is used, it is to be set to 0. The vendor/org-ID field 1006 includes the high-order octet is 0 and the low-order 3 octets, as defined in the Assigned Numbers RFC [RFC 1700]. The vendor-NVSE-type field 1008 indicates the particular type of vendor-NVSE-extension. The vendor-NVSE-value 1010 is vendor/organization specific data of this vendor-NVSE-extension. In one embodiment, as an example, the vendor/org-ID 1006 may be set to 5535 for 3GPP2 Internet assigned numbers authority (IANA) compliance. The vendor-NVSE-type field 1008 is to be determined and the vendor-NVSE-value field 1010 contains the encrypted session key.

In one embodiment of the present invention, PPP vendor specific packet may be used entirely (i.e., instead of PPP vendor specific packet and RRQ) to securely negotiate a key. Therefore, the session key signaling (i.e., 904 and 906 of FIG. 9) may be performed during the LCP or NCP phase of signaling. In one embodiment, the PDSN 902 sends a public key in the PPP packet as shown by 904 and the encrypted session key is sent from the mobile node 900 to the PDSN 904 in a PPP packet as shown by 906. The PDSN commits the decrypted session key when the CHAP/PAP authentication passes. For example, (a) the PDSN sends its public key in a PPP vendor specific packet (LCP) to the mobile node 900; (b) the mobile node 900 send the encrypted session key in a PPP vendor specific packet (LCP) to the PDSN; and (c) steps (a) and (b) are performed in the LCP phase and prior to authentication (CHAP/PAP).

In another embodiment of the present invention, (a) the PDSN sends its public key in a PPP vendor specific packet (NCP) to the mobile node 900; (b) the mobile node 900 send the encrypted session key in a PPP vendor specific packet (NCP) to the PDSN; and (c) steps (a) and (b) are performed in the NCP phase and prior to authentication (CHAP/PAP).

Figure 11:
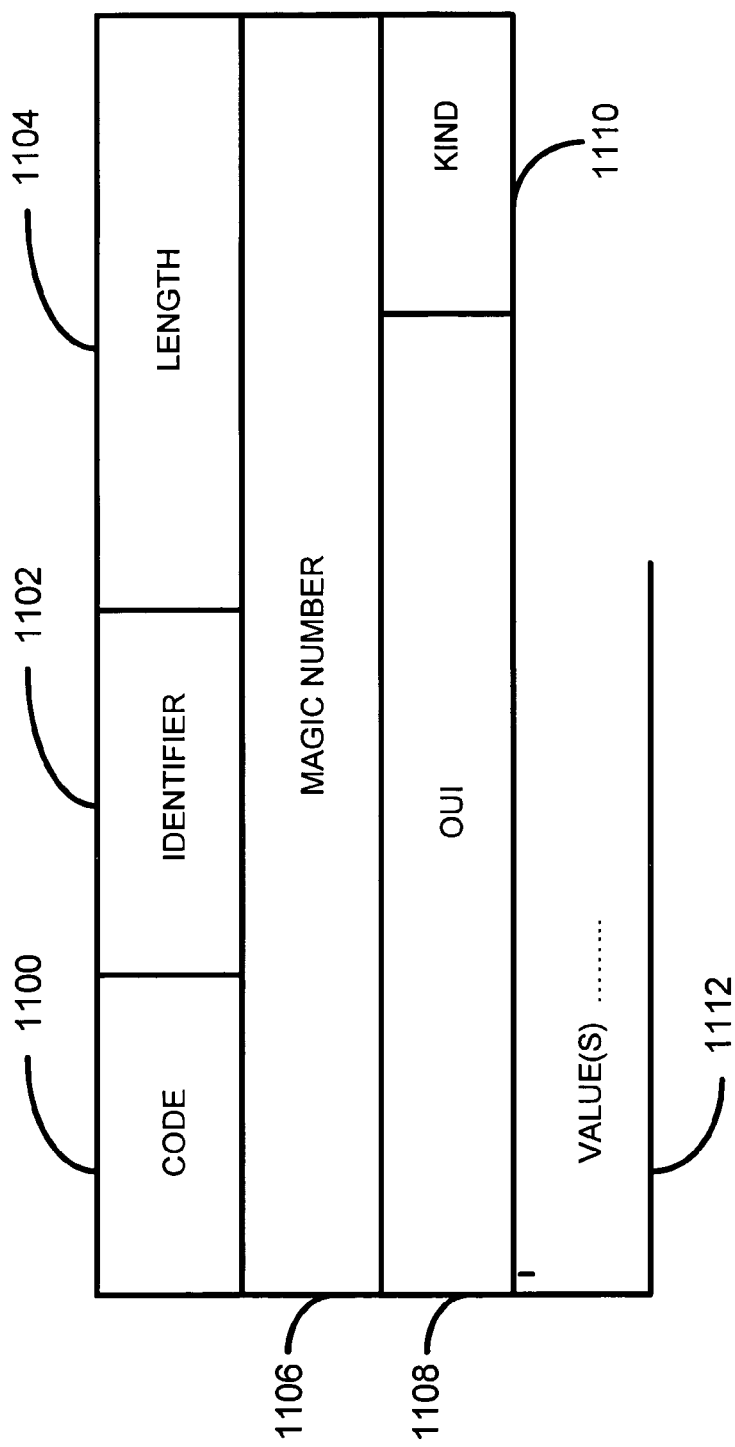
FIG. 11 displays PPP vendor specific packet format as defined by RFC 2153.

FIG. 11 displays PPP vendor specific packet format as defined by RFC 2153. The code field 1100 is 0 for vendor specific data. The identifier field 1102 must be changed for each vendor specific packet sent. The length field 1104 is set greater than and/or equal to 12. When the length is twelve, no value(s) field 1112 is present. The magic number field 1106 is set to four octets and aids in detecting links that are in the looped-back condition. Until the magic-number configuration option has been successfully negotiated, the magic number 1106 must be transmitted as zero. The OUI field 1108 is three octets and represents the vendor's organizationally unique identifier. The kind field 1110 is one octet and indicates a sub-type for the OUI. The value(s) field 1112 is zero or more octets. The details of the value(s) field 1112 are implementation specific.

In one embodiment of the present invention, as an example in a 3GPP2 implementation, the OUI field 1108 is set to CF0002 to comply with IANA. The kind field 1110 is to be determined. The value(s) field 1112 includes the public key of the PDSN when sent from the PDSN. When sent from the mobile node, the value field 1112 will include the encrypted session key.

Figure 12:
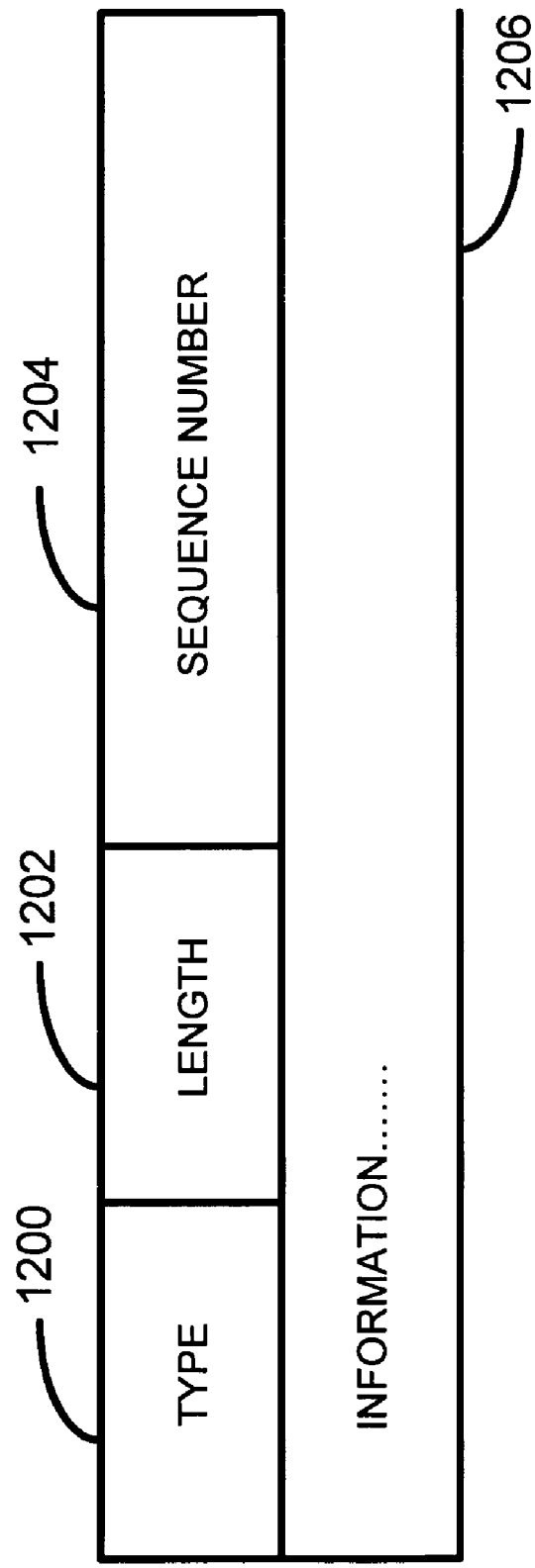
FIG. 12 displays an extension to an Internet Control Message Protocol (ICMP) packet format compliant with RFC 792.

FIG. 12 displays an extension to an Internet Control Message Protocol (ICMP) packet format compliant with RFC 792. A type field is shown as 1200. The type field 1200 defines the type of the packet. A length field is shown as 1202. The length field 1202 defines the length of the packet. A sequence number field is shown as 1204. The sequence number field 1204 represents the sequence of the packet. An information field is shown as 1206. The information field 1206 is a field identified for information. In one embodiment of the present invention, the information field 1206 may be used to communicate the public key during a forward path communication. In another embodiment of the present invention, the information field 1206 may be used to communicate an encrypted session key during a return path communication.

The extension to the ICMP packet format may be implemented during a variety of different messaging sequences. In one embodiment, the extension to the ICMP packet format shown in FIG. 12 may be implemented as an extension to an ICMP router advertisement type 9. In another embodiment, the extension to the ICMP packet format shown in FIG. 12 may be implemented as an extension to an ICMP router solicitation type 10.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of securely negotiating a session key between a mobile node and a router in a network, the method comprising:

initiating a communication session between the mobile node and the router using a protocol, including a process of registering or authenticating the mobile node within the network using the protocol;

receiving from the router a public key within a first protocol message, the first protocol message having a format defined by the protocol, wherein the first protocol message is a protocol vendor specific packet including the public key;

obtaining the session key;

generating an encrypted session key from the session key; and during the process of registering or authenticating the mobile node, communicating the encrypted session key to the router within a second protocol message, the second protocol message having a format defined by the protocol, wherein the second protocol message is an initial request (RRQ) message including the encrypted session key.

2. The method as set forth in claim 1 wherein the protocol is a standardized protocol.

3. The method as set forth in claim 1 wherein communicating the encrypted session key occurs during the process of registering or authenticating the mobile node in the network.

4. The method as set forth in claim 1 wherein the protocol is defined as Point-to-Point protocol (PPP).

5. A method of securely negotiating a session key between a mobile node and a router in a network, the method comprising:

communicating a public key to the mobile node within a first protocol message defined by a protocol during a process of registering or authenticating the mobile node within the network using the protocol, the first protocol message having a format defined by the protocol, wherein the first protocol message is a protocol vendor specific packet including the public key;

during the process of registering or authenticating the mobile node, receiving an encrypted session key from the mobile node within a second protocol message defined by the protocol in response to communicating the public key, the encrypted session key generated from the session key, the second protocol message having a format defined by the protocol, wherein the second protocol message is an initial request (RRQ) message including the encrypted session key; and during the process of registering or authenticating the mobile node, decrypting the encrypted session key with a private key.

6. The method as set forth in claim 5 wherein the protocol is a standardized protocol.

7. The method as set forth in claim 5 wherein communicating the encrypted session key occurs during the process of registering or authenticating the mobile node in the network.

8. The method as set forth in claim 5 wherein the protocol is defined as Point-to-Point protocol (PPP).

9. A mobile node comprising:
a processing unit communicatively coupled to a memory for storing a session key;
the mobile node initiating a communication session using a defined protocol and initiating a process of registering or authenticating the mobile node within a network using the protocol;
during the process of registering or authenticating the mobile node, the mobile node receiving from a router a public key within a first protocol message defined by the protocol, the first protocol message having a format defined by the protocol, wherein the first protocol message is a protocol vendor specific packet including the public key;
the processing unit generating an encrypted session key from the session key; and
during the process of registering or authenticating the mobile node, the mobile node communicating the encrypted session key to the router within a second protocol message defined by the protocol, the second protocol message having a format defined by the protocol, wherein the second protocol message is an initial request (RRQ) message including the encrypted session key.

10. The mobile node as set forth in claim 9 wherein the mobile node communicates the encrypted session key during the process of registering or authenticating the mobile node in the network.

11. The mobile node as set forth in claim 9, wherein the protocol is defined as Point-to-Point protocol (PPP).

12. A method of securely negotiating a session key between a mobile node and a router in a network, the method comprising:

initiating a communication session between the mobile node and the router using a protocol, including a process of registering or authenticating the mobile node within the network using the protocol;
receiving from the router a public key within a first protocol message, the first protocol message having a format defined by the protocol, wherein the first protocol message is a protocol vendor specific packet including the public key;
obtaining the session key;
generating an encrypted session key from the session key; and
during the process of registering or authenticating the mobile node, communicating the encrypted session key to the router within a second protocol message, the second protocol message having a format defined by the protocol, wherein the second protocol message is a protocol vendor specific packet including the encrypted session key.

13. The method as set forth in claim 12, wherein communicating the encrypted session key occurs during the process of registering or authenticating the mobile node in the network.

14. The method as set forth in claim 12, wherein the protocol is defined as Point-to-Point protocol (PPP).

15. A mobile node comprising:
a processing unit communicatively coupled to a memory for storing a session key, wherein the memory comprises program instructions executable by the processor to:
initiate a communication session using a defined protocol and initiate a process of registering or authenticating the mobile node within a network using the protocol;
receive from a router, during the process of registering or authenticating the mobile node, a public key within a first protocol message defined by the protocol, the first protocol message having a format defined by the protocol, wherein the first protocol message is a protocol vendor specific packet including the public key;
generate an encrypted session key from the session key; and
communicate the encrypted session key to the router, wherein communicating the encrypted session key is performed during the process of registering or authenticating the mobile node, wherein the encrypted session key is communicated within a second protocol message defined by the protocol, the second protocol message having a format defined by the protocol, wherein the second protocol message is a protocol vendor specific packet including the encrypted session key.

16. The mobile node as set forth in claim 15, wherein the program instructions are configured to communicate the encrypted session key during the process of registering or authenticating the mobile node in the network.

17. The mobile node as set forth in claim 15, wherein the protocol is defined as Point-to-Point protocol (PPP).

* * * * *